United States Patent [19]
Greene et al.

[11] Patent Number: 5,588,085
[45] Date of Patent: Dec. 24, 1996

[54] RADIOLYTIC METHOD FOR MAKING A MODE-FIELD TRANSFORMING OPTICAL WAVEGUIDE

[75] Inventors: Benjamin I. Greene, Westfield; Chellappan Narayanan, North Plainfield; Herman M. Presby, Highland Park, all of N.J.

[73] Assignee: Lucent Technologies Inc., Murray Hill, N.J.

[21] Appl. No.: 633,323

[22] Filed: Apr. 17, 1996

[51] Int. Cl.$^6$ .......................... G02B 6/02; C03B 37/023
[52] U.S. Cl. ...................... 385/123; 385/28; 385/124; 385/141; 385/144; 65/385
[58] Field of Search .................... 385/14, 28, 29, 385/123, 124, 129, 130, 132, 141, 142, 144; 359/652, 653; 65/385, 425

[56] References Cited

U.S. PATENT DOCUMENTS

| | | | |
|---|---|---|---|
| 4,179,187 | 12/1979 | Maurer | 385/28 X |
| 4,799,761 | 1/1989 | Yamamoto et al. | 385/124 |
| 4,971,423 | 11/1990 | Nakata et al. | 385/124 X |
| 5,035,477 | 7/1991 | Schlump | 385/123 |
| 5,301,252 | 4/1994 | Yanagawa et al. | 385/96 |
| 5,381,503 | 1/1995 | Kanamori t al. | 385/123 |
| 5,381,505 | 1/1995 | Fischietto et al. | 385/123 X |
| 5,416,863 | 5/1995 | Vengsarkar | 385/28 |
| 5,446,820 | 8/1995 | Ishikawa et al. | 385/123 |
| 5,502,786 | 3/1996 | Inniss et al. | 385/123 |
| 5,506,925 | 4/1996 | Greene et al. | 385/129 |
| 5,528,716 | 6/1996 | Inniss et al. | 385/123 |

OTHER PUBLICATIONS

"Tapered-Beam Expander for Single-Mode Optical-Fibre Gap Devices", K. P. Jedrzejewski et al., Electronics Letters Jan. 16, 1986, vol. 22, No. 2 pp. 105, 106.

"Optical Fiber Tapers–A Novel Approach to Self-Aligned Beam Expansion and Single-Mode Hardware", N. Amitay et al, Jour. of Lightwave Tech., vol. LT-5, No. 1, Jan. 1987, pp. 70-76.

"Laser-Trimmed Four-Port Bandpass Filter Fabricated in Single-Mode Photosensitive Ge-Doped Planar Waveguide", R. Kashyap et al., IEEE Photonics Technology Letters, vol. 5, No. 2, Feb. 1993, pp. 191-194.

"Increase in Photosensitivity in Silica-Based Optical Waveguides on Silicon", Y. Hibino et al., Electronics Letters, Apr. 1, 1993, vol. 29, No. 7, pp. 621-623.

"Mechanisms of Enhanced UV Photosensitivity Via Hydrogen Loading in Germanosilicate Glasses", R. M. Atkins et al., Electronics Letters, vol. 29, No. 14, Jul. 8, 1993, pp.1234-1235.

"Low-Loss (~0.15 dB) Arc Fusion Splicing of Erbium-Dobped Fibers With High Strength (~400 ksi) For Highly Reliable Optical Amplifier Systems", S. G. Kosinski et al., Optical Fiber Communication Conference, Feb. 2-7, 1992.

"Laser-Trimmed Four-Port Bandpass Filter Fabricated in Single-Mode Photosensitive Ge-Doped Planar Waveguide", R. Kashyap et al., IEEE Photonics Technology Letters vol. 5, No. 2, Feb. 1993, pp. 191-194.

"Increased in Photosensitivity in Silica-Based Optical Waveguide on Silicon", Y. Hibino et al., Electronics Letters, Apr. 1, 1993, vol. 29, No.7, pp. 621-623.

"Mechanisms of Enhanced UV Photosensitivity Via Hydrogen Loading in Germanosilicate Glasses", R. M. Atkins et al., Electronics Letters, vol. 29, No. 14, Jul. 8, 1993, pp 1234-1235.

"Low-Loss (~0.15 dB) Arc Fusion Splicing of Erbium-Doped Fibers With High Strength (~400 ksi) for Highly Reliable Optical Amplifier Systems", S. G. Kosinski et al., Optical Fiber Communication Conference, Feb. 2-7, 1992.

*Primary Examiner*—Brian Healy
*Attorney, Agent, or Firm*—Brian K. Dinicola

[57] ABSTRACT

A method of making a silicate optical waveguide structure for transforming an optical beam of a first modal spot size to a beam of a second modal spot size includes the step of selecting an irradiation energy which is at least partially absorbed by the cladding of the structure. A variable dosage of radiation is then provided along the length of the structure. The radiation has an energy equal to the selected irradiation energy so that a refractive index change of the cladding is greater than a refractive index change of the core.

14 Claims, 2 Drawing Sheets

… … …

RADIOLYTIC METHOD FOR MAKING A MODE-FIELD TRANSFORMING OPTICAL WAVEGUIDE

FIELD OF THE INVENTION

This invention relates to optical waveguiding structures and, in particular, to waveguiding structures, such as optical fibers, especially adapted for transforming an optical beam of a first modal spot size to a beam of a second modal spot size.

BACKGROUND OF THE INVENTION

As optical fiber communications systems proliferate, the problem of interconnecting optical components having unequal modal spot sizes assumes increasing importance. Such interconnections are required in a variety of circumstances including: 1) the interconnection of laser sources to fibers, 2) the interconnection of two fibers having dissimilar modal properties, and 3) the interconnection of fibers to waveguides and waveguides to fibers. Such interconnections have been an area of active research, and a variety of approaches have been developed. For example, pretapered performs have been prepared to draw tapered regions for connecting lasers to fibers. (see J. Armitay et al., J. Lightwave Technol. LT-5, 70, 1987). Fibers have been tapered through capillaries in order to achieve beam-expansion (see K. P. Jedrzejewski, 22 Electron. Lett. 106, 1986) and fiber cores have been thermally expanded for splicing dissimilar fibers (see S. G. Kosinski et al., Proc. Optical Fiber Communications Conference OFC, Paper Th 16, 231, 1992). These techniques, however, all depend on control of the physical dimensions of the fiber core—a control which is difficult and expensive to achieve.

Another technique for fabricating a waveguide structure that transforms an optical beam of a first modal spot size to a beam of a second modal spot size is disclosed in U.S. Pat. No. 5,416,863 to Vengsarkar. In Vengsarkar the modal spot size is varied by varying the refractive index differential between the core and cladding. Vengsarkar accomplishes this variation in the refractive index differential by irradiating the waveguide structure at a wavelength which is absorbed by photosensitive defects in the core material so that the refractive index differential increases. In particular, Vengsarkar increased the index differential in germanium-doped silica waveguides by irradiation with ultraviolet light at a wavelength of 247–248 nm. This wavelength corresponds to germania-related color center defects that are known to be present in the germanosilicate core material. In Vengsarkar, the photosensitivity of the germanium-doped core was enhanced by impregnating the core with molecular hydrogen. This technique is well known and is disclosed, for example, in R M. Arkins et al., "Mechanisms of Enhanced UV Photosensitivity Via Hydrogen Loading in Germanosilicate Glasses," Electron. Lett., vol. 29, p. 1234, 1993. However, similar to the limitations of the method disclosed by Hibino et al., Electron. Lett., vol. 29, pp. 621–623, 1993, which is discussed in co-pending application Ser. No. 08/396023, U.S. Pat. No. 5,506,925 Vengsarkar's method is applicable only to germano-silicate waveguides.

While the prior art has increased the refractive index differential between the core and cladding of a single waveguide structure formed from one particular material, there is no method for selecting an appropriate wavelength that decreases the refractive index differential in a wide variety of waveguides having different core and cladding compositions.

SUMMARY OF THE INVENTION

A method is disclosed of making a silicate optical waveguide structure for transforming an optical beam of a first modal spot size to a beam of a second modal spot size. In accordance with the invention, an irradiation energy is selected which is at least partially absorbed by the cladding. A variable dosage of radiation is then provided along the length of the structure. The radiation has an energy equal to the selected irradiation energy so that a refractive index change of the cladding is greater than a refractive index change of the core.

DETAILED DESCRIPTION

Figure 1:
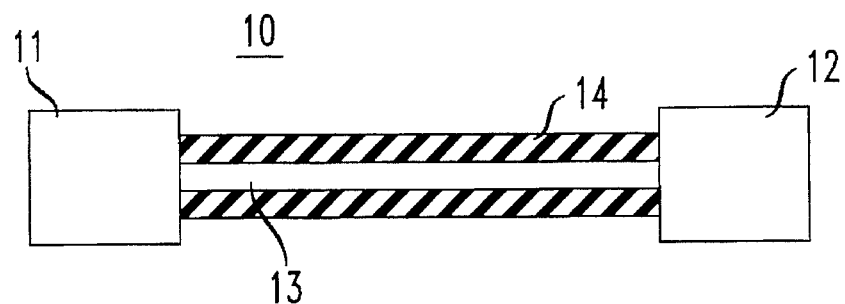
FIG. 1 is a schematic cross section of a mode-field transforming optical waveguide interconnecting optical components having different modal spot sizes.

Referring to the drawings, FIG. 1 is a schematic cross section of a mode-field transforming optical waveguide 10 interconnecting generalized optical components 11 and 12 having different modal spot sizes. Elements 11 and 12 can be any optical components that transmit optical beams in modes such as lasers and waveguides including optical fibers. Preferably waveguide 10, which can be in the form of an optical fiber, comprises a length of glass waveguide core 13 peripherally surrounded by cladding 14. The index of refraction of the core ($N_1$) is larger than that of the cladding ($N_2$). In accordance with the invention, the normalized index differential $$\Delta = (N_1 - N_2)/N_1$$

varies as a function of distance x along the length of the waveguide in order to match the modal spot sizes of components 11 and 12. For example, if component 11 transmits an optical beam of larger modal spot size than component 12, transforming waveguide 10 is provided with a longitudinal index differential variation tailored to reduce the modal spot size of component 11 to that of component 12 as the beam passes through 10 into 12.

As previously noted, Vengsarkar discloses a method of decreasing the modal spot size in a germano-silicate waveguide by irradiating the waveguide with radiation that is absorbed by defects in the waveguide core. The method disclosed by Vengsarkar is applicable only to germano-silicate waveguides because the radiation is not absorbed by the cladding layer to any substantial degree. In contrast, application Ser. No. 08/396023, employs a technique in which a waveguide is irradiated at a wavelength which is absorbed by at least the cladding layer, and possibly the core layer, such that the refractive index of the cladding increases more rapidly than the core, hence decreasing the index differential with increasing exposure time.

The inventive method of transforming a modal spot size, which is based on the technique disclosed in application Ser. No. 08/396023, now U.S. Pat. No. 5,506,925, will be illustrated for phosphorous-doped silicate waveguides fabricated on silicon substrates. However, as one of ordinary skill will recognize, the present invention may be applied to silica waveguides with different dopants by appropriately adjusting the various parameters set forth below.

In accordance with the present invention, phosphorous-doped silicate waveguides were exposed to unpolarized ultraviolet radiation at a wavelength of 193 nm from an ArF excimer laser. More specifically, the waveguides had a core doped with 4% phosphorus and a BPTEOS cladding doped with 4% boron and 2.5% phosphorous. Both the core and cladding absorb radiation at this wavelength and it was determined that the degree of absorbance by the cladding was similar to or greater than the absorbance by the core. The radiation was pulsed at a repetition rate of 30–100 Hz at fluences of 8–75 mJ/cm$^2$/pulse. The dosage applied to the waveguide varied along its length so that the resulting change in the refractive index differential also varied along the length of the waveguide.

Figure 2:
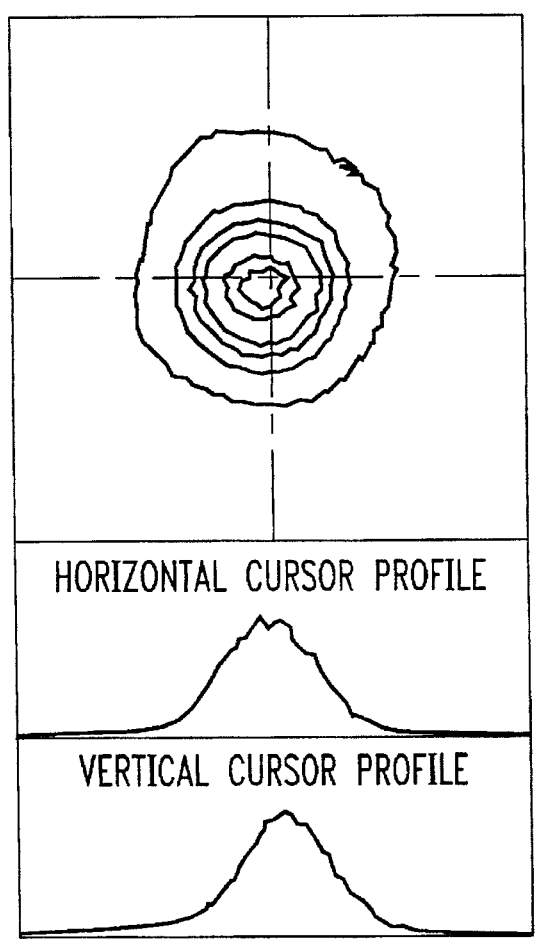
FIGS. 2 and 3 show near field images of the modal spot of a typical planar waveguide sample before and after, respectively, a UV irradiation procedure in accordance with the present invention.
Figure 3:
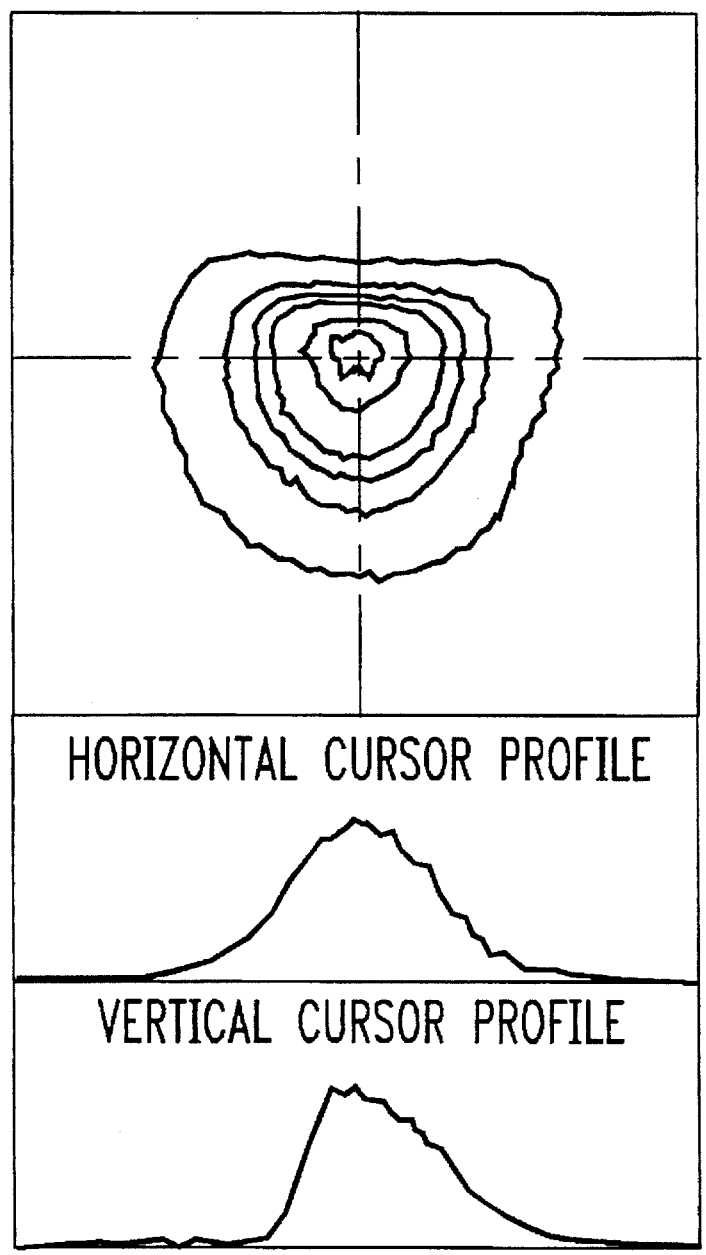

FIGS. 2 and 3 show near field images of the modal spot of a typical planar waveguide sample both before and after UV irradiation, respectively. The images, which were taken under the same magnification conditions, are shown for purposes of comparison. The dimensions of the image are not calibrated to an absolute scale and the light intensities are displayed in a contour plot format. FIGS. 2 and 3 show that the modal spot shape and area both underwent change after irradiation. By choosing criteria of fractional area above 50% of the peak intensity, for instance, a 10% increase is observed in the modal spot size after irradiation relative to before irradiation. The modal spot changes shape because the core is surrounded by BPTEOS on three sides and is surrounded by pure silica on the remaining side. BPTEOS and pure silica manifest considerably different refractive index changes when exposed to UV light.

As indicated by the example above, the present invention selects an appropriate irradiation energy (or equivalently, wavelength) at which to expose the waveguides. The inventors have discovered that the wavelength selected must undergo electronic absorption in at least the cladding layer. The selected wavelength may also undergo significant absorption in the core, but this is not required by the present invention. The selected wavelengths cause the refractive index of the cladding to increase more rapidly than the refractive index of the core, hence decreasing the refractive index differential between core and cladding. Appropriate wavelengths can be determined by any technique desired, including an empirical technique in which various wavelengths are used and the resulting refractive index change measured. Appropriate radiation dosages will depend on the initial and final modal spot sizes and the length over which this transformation is to occur. Generally, the greater the dosage (up to some maximum) the greater the decrease in the refractive index differential and hence the greater the increase in the modal spot size.

The inventive waveguide may be stabilized so that the refractive index differential does not undergo substantial decay over time. As discussed in co-pending application Ser. No. 08/396023, now U.S. Pat. No. 5,506,925, such stabilization may be achieved by thermally annealing the device after exposing it to radiation.

We claim:

1. A method for making a silicate optical waveguide structure for transforming an optical beam of a first modal spot size to a beam of a second modal spot size, said method comprising the step of:

selecting an irradiation energy that is at least partially absorbed by the cladding;

applying a variable dosage of radiation along the length of said structure, said radiation having an energy equal to said irradiation energy such that a refractive index change of the cladding is greater than a refractive index change of the core.

2. The method of claim 1 wherein said variable dosage increases along the length of the structure such that the second modal spot size is greater than the first modal spot size.

3. The method of claim 1 wherein Said irradiation energy corresponds to ultraviolet radiation.

4. The method of claim 1 wherein said waveguide core is composed of phosphorous-doped silica and said irradiation energy corresponds to ultraviolet radiation.

5. The method of claim 4 wherein said irradiation energy has a wavelength of 193 nm.

6. The method of claim 5 wherein said radiation is provided by an excimer UV lamp.

7. The method of claim 1 further comprising the step of annealing said waveguide structure.

8. A silicate optical waveguide structure having a core and cladding for transforming an optical beam of a first modal spot size to a beam of a second modal spot size, said structure fabricated by a method including the steps of:

selecting an irradiation energy that is at least partially absorbed by the cladding;

applying a variable dosage of radiation along the length of said structure, said radiation having an energy equal to said irradiation energy such that a refractive index change of the cladding is greater than a refractive index change of the core.

9. The structure of claim 8 wherein said variable dosage increases along the length of the structure such that the second modal spot size is greater than the first modal spot size.

10. The structure of claim 8 wherein said irradiation energy corresponds to ultraviolet radiation.

11. The structure of claim 8 wherein said waveguide core is composed of phosphorous-doped silica and said irradiation energy corresponds to ultraviolet radiation.

12. The structure of claim 11 wherein said irradiation energy has a wavelength of 193 nm.

13. The structure of claim 12 wherein said radiation is provided by an excimer UV lamp.

14. The structure of claim 8 further comprising the step of annealing said waveguide structure.

\* \* \* \* \*